UNITED STATES PATENT OFFICE.

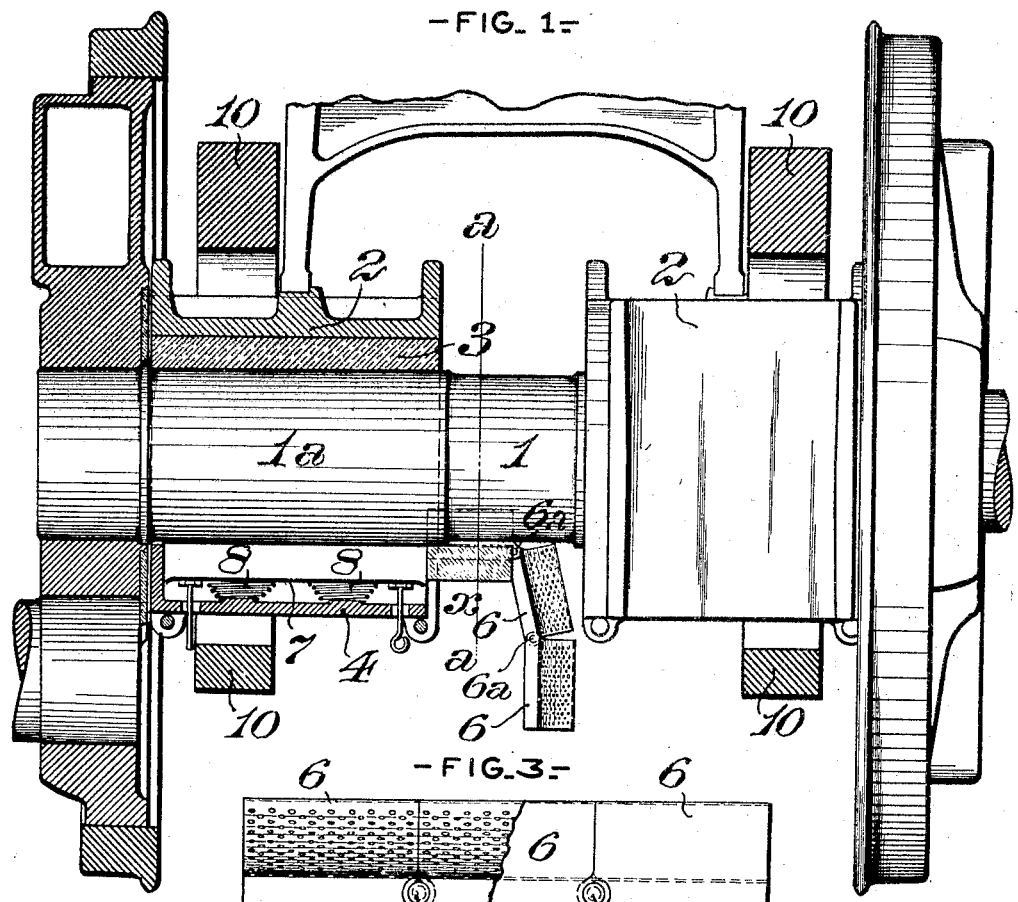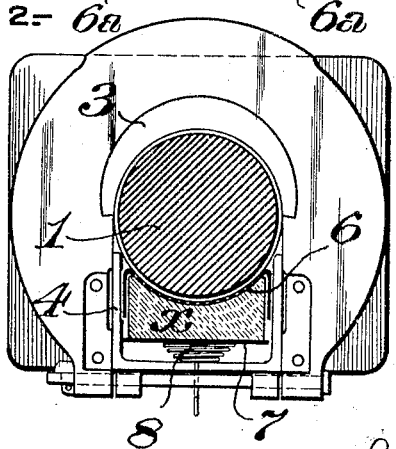

JOHN A. BOWLES, OF RICHMOND, VIRGINIA.

LOCOMOTIVE-DRIVING-BOX LUBRICATOR.

1,327,136.  Specification of Letters Patent.  Patented Jan. 6, 1920.

Application filed June 16, 1919. Serial No. 304,553.

*To all whom it may concern:*

Be it known that I, JOHN A. BOWLES, of Richmond, in the county of Henrico and State of Virginia, have invented a certain new and useful Improvement in Locomotive-Driving-Box Lubricators, of which improvement the following is a specification.

My invention relates to lubricators for the driving boxes of locomotive engines, of the general class or type in which a block of solid lubricant is held in proximity to an axle journal and adjoining portions thereof successively and continuously fed to the journal, by the action of the journal thereon in its rotation, as exemplified in Letters Patent Reissue No. 12134, granted and issued to Albert G. Elvin, under date of July 31, 1903, and in other Letters Patent subsequently granted to said patentee.

The object of my invention is to provide means for the convenient application of the system of solid grease lubrication which is practised with the appliances of the Letters Patent above referred to, in connection with what are known to locomotive constructors as "long driving boxes," *i. e.*, those which are of materially greater length than in ordinary practice, and which, therefore, have their inner ends located much nearer together. By reason of such location, it becomes necessary to remove the driving box cellar, whenever the box requires to be repacked by the insertion of a new block or cake of solid lubricant. This objection is wholly overcome by my invention, without involving any modification of the driving box or its cellar.

The improvement claimed is hereinafter fully set forth.

In the accompanying drawings: Figure 1 is a view, half in elevation and half in vertical longitudinal central section, of a pair of long driving boxes mounted on a locomotive axle, illustrating an application of my invention; Fig. 2, a transverse section through the axle, on the line *a a* of Fig. 1, showing, in elevation, an inner end view of a driving box; and, Fig. 3, a view, partly in side elevation, and partly in longitudinal central section, and on an enlarged scale, of a lubricant delivery plate.

My invention is herein exemplified as applied in connection with a long driving box, 2, which is adapted to be supported on one of the journals, 1ª, of a locomotive axle, 1, between pedestal jaws on the frame members, 10, and is, as usual, provided with an upper bearing brass, 3, and a lower lubricant cellar, 4. As in prior practice, the lubrication of the journal is effected by the application of a block or cake, *x*, of solid lubricant, which is held in a lubricant cellar, 4, fitted in the lower portion of the driving box, between the downwardly projecting side members of a lubricant delivery plate, 6, which is curved in conformity with, and fits against, the lower surface of the journal. The bottom of the block of lubricant, *x*, rests on a follower plate, 7, which is subject to the upward pressure of springs, 8, by which the lubricant is maintained in contact with the delivery plate, 6, the curved portion of which is perforated throughout its length.

As will appear by reference to Fig. 1 of the drawing, the long driving boxes of present practice are of such length that the distance between their inner ends is not sufficiently great to permit a block of lubricant of the full length of the journal to be inserted at the inner end of a driving box, and therefore it becomes necessary to take down the lubricant cellar, in order to repack the box. My invention is designed to overcome this material objection, and, to that end, I form the lubricant delivery plate, 6, in a plurality of longitudinally adjoining sections, which are articulated, one to the other, by pins or rivets, 6ª, fitted in the lower portions of their side members. By the application of this construction, the members of a plurality of blocks, *x*, of solid lubricant, each of which is substantially of the length of a section of the plate, and the aggregate length of which will be substantially equal to that of the axle journal, may be successively inserted in the articulated lubricant delivery plate, and moved into operative position in the lubricant cellar, without necessitating the taking down of the latter, as in ordinary practice.

I claim as my invention and desire to secure by Letters Patent:

1. The combination, with a "long" driving box, and a lubricant cellar fitted therein, of means for inserting blocks of solid lubricant of aggregate length substantially equal to that of the driving box, at the inner end thereof, without removal of the lubricant cellar.

2. The combination of a "long" driving box; a lubricant cellar fitted therein; and a perforated lubricant delivery plate, adapted to be located in the lubricant cellar, and comprising a plurality of longitudinally articulated sections.

3. A lubricant delivery plate for "long" driving boxes comprising a plurality of sections, having perforated upper members adapted to fit on a driving axle journal, said sections being articulated, one to another, by pivotal connections fitted in downwardly projecting side members.

JOHN A. BOWLES.

Witnesses:
E. E. RUCKER,
J. R. BARKER.